(12) United States Patent
Ofer et al.

(10) Patent No.: US 10,417,063 B2
(45) Date of Patent: Sep. 17, 2019

(54) ARTIFICIAL CREATION OF DOMINANT SEQUENCES THAT ARE REPRESENTATIVE OF LOGGED EVENTS

(71) Applicant: Microsoft Technology Licensing, LLC, Redmond, WA (US)

(72) Inventors: Roy Ben Ofer, Tel Aviv (IL); Adi Eldar, Kiryat-Ono (IL); Yehezkel Shraga Resheff, Tel Aviv (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 80 days.

(21) Appl. No.: 15/636,137

(22) Filed: Jun. 28, 2017

(65) Prior Publication Data

US 2019/0004875 A1 Jan. 3, 2019

(51) Int. Cl.
*G06F 9/54* (2006.01)
*G06F 11/34* (2006.01)
*G06F 11/30* (2006.01)

(52) U.S. Cl.
CPC .......... *G06F 9/542* (2013.01); *G06F 11/3024* (2013.01); *G06F 11/3409* (2013.01)

(58) Field of Classification Search
CPC ... G06F 9/542; G06F 11/3409; G06F 11/3024
See application file for complete search history.

(56) References Cited

U.S. PATENT DOCUMENTS

| | | | |
|---|---|---|---|
| 7,051,029 B1 * | 5/2006 | Fayyad | G06F 17/30876 |
| 7,676,760 B1 | 3/2010 | Rosenquist et al. | |
| 8,386,466 B2 | 2/2013 | Park et al. | |
| 9,519,698 B1 | 12/2016 | Lee et al. | |
| 9,558,196 B2 | 1/2017 | Johnston et al. | |
| 2003/0154237 A1 * | 8/2003 | Mah | G06F 17/30905 709/201 |

(Continued)

OTHER PUBLICATIONS

Leemans, et al., "Discovery of Frequent Episodes in Event Logs", In Proceedings of I4th International Symposium on Data-driven Process Discovery and Analysis, Nov. 19, 2014, pp. 1-30.

(Continued)

*Primary Examiner* — Charles E Anya
(74) *Attorney, Agent, or Firm* — Watson Patents, PLC; Vladan M. Vasiljevic (57) ABSTRACT

Dominant sequences that are representative of logged events can be artificially created. Initially, a graph comprising multiple nodes and edges between pairs of nodes is generated from logged information. The weights, or values, associated with edges are incremented as the log data reveals a temporal relationship between two nodes. Subsequently, a set of candidate trajectories, with each candidate trajectory representing a sequence of events, are generated by repeatedly traversing the generated graph in a random manner by commencing at randomly selected nodes and then proceeding in a random manner to subsequent nodes in accordance with the edge values, for a random quantity of steps. The candidate trajectories are filtered to eliminate those that are impossible or improbable based on a comparison between individual candidate trajectories and the quantity of occurrences within the logs. Scoring is based both on a quantity of occurrences as well as a quantity of steps.

20 Claims, 5 Drawing Sheets

(56) References Cited

U.S. PATENT DOCUMENTS

| | | | |
|---|---|---|---|
| 2003/0220940 A1 | 11/2003 | Futoransky et al. | |
| 2009/0024911 A1 | 1/2009 | Margolis | |
| 2011/0307436 A1* | 12/2011 | Cai | G06F 17/30625 |
| | | | 706/48 |
| 2014/0280550 A1* | 9/2014 | Glass | H04L 67/22 |
| | | | 709/204 |
| 2014/0297740 A1* | 10/2014 | Narayanan | H04L 67/306 |
| | | | 709/204 |
| 2016/0253232 A1 | 9/2016 | Puri et al. | |
| 2018/0027084 A1* | 1/2018 | Lipka | H04L 67/22 |
| | | | 709/224 |

OTHER PUBLICATIONS

Ofer, et al. "Algorithms for Telemetry Data Mining using Discrete Attributes", In Proceedings of the 6th International Conference on Pattern Recognition Applications and Methods (ICPRAM 2017) pp. 309-317.

* cited by examiner

ARTIFICIAL CREATION OF DOMINANT SEQUENCES THAT ARE REPRESENTATIVE OF LOGGED EVENTS

BACKGROUND

Increasingly, multitudes of individual users rely on networked computing devices to provide functionality and to enable those users to perform tasks with such provided functionality. Because of the ubiquity of network communications, computing functionality provided over a network can be accessed by millions of different users on a daily basis. While the interactions of such users with the networked computing devices can be logged, the sheer volume of such logged information can render such logged information very difficult to parse and even more difficult to mine for information that can be utilized to improve the operation of such networked computing devices, improve the functionality provided, or combinations thereof. More specifically, patterns or sequences of events can be hidden within such voluminous logged information, where such patterns or sequences of events, if known, could identify failure vectors that should be corrected, user behavioral patterns that can be more efficiently utilized for greater productivity or throughput, and other like operational or functional improvements.

SUMMARY

Dominant sequences that are representative of logged events can be artificially created, thereby providing usable feedback from otherwise unwieldy logs. Initially, logged information can be partitioned based on a selected logged attribute. Subsequently, a graph comprising multiple nodes and edges between pairs of nodes can be generated from such partitioned logged information, with each node in the graph representing a unique attribute-value pair from the logged information. As the logged data is traversed for purposes of generating such a graph, the weights, or values, associated with edges can be incremented as the log data reveals a conceptually adjacent relationship between two logged events represented by two nodes connected by the incremented edge. Subsequently, a set of candidate trajectories, with each candidate trajectory representing a sequence of events, can be generated by repeatedly traversing the generated graph in a random manner. More specifically, such traversals can commence at randomly selected nodes and can then proceed in a random manner to subsequent nodes in accordance with the edge values previously determined. Such traversals can proceed for a random quantity of steps through the graph. The candidate trajectories can then be filtered to eliminate candidate trajectories that are impossible or improbable. Such filtering can be based on a comparison between an individual candidate trajectory and the quantity of occurrences of that candidate trajectory within the logs. Of the remaining candidate trajectories, they can be scored based both on a quantity of occurrences of each such candidate trajectory within the logs, as well as based upon a quantity of steps in each candidate trajectory. Highly scored candidate trajectories, therefore, can represent sequences of events that both occur with sufficient regularity within the logged data, and are of an increased length, thereby providing actionable feedback. As an optimization, prior to the generation of a graph from the logs, the logs can be filtered to remove attributes whose values lack repetition or are otherwise too uniquely or evenly spread out to facilitate efficient analysis.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Additional features and advantages will be made apparent from the following detailed description that proceeds with reference to the accompanying drawings.

DESCRIPTION OF THE DRAWINGS

The following detailed description may be best understood when taken in conjunction with the accompanying drawings, of which.

DETAILED DESCRIPTION

The following description relates to the artificial creation of dominant sequences that are representative of logged events, thereby providing usable feedback from otherwise unwieldy logs. Initially, logged information can be partitioned based on a selected logged attribute. Subsequently, a graph comprising multiple nodes and edges between pairs of nodes can be generated from logged information, with each node in the graph representing a unique attribute-value pair from the logged information. As the logged data is traversed for purposes of generating such a graph, the weights, or values, associated with edges can be incremented as the log data reveals a conceptually adjacent relationship between two logged events represented by two nodes connected by the incremented edge. Subsequently, a set of candidate trajectories, with each candidate trajectory representing a sequence of events, can be generated by repeatedly traversing the generated graph in a random manner. More specifically, such traversals can commence at randomly selected nodes and can then proceed in a random manner to subsequent nodes in accordance with the edge values previously determined. Such traversals can proceed for a random quantity of steps through the graph. The candidate trajectories can then be filtered to eliminate candidate trajectories that are impossible or improbable. Such filtering can be based on a comparison between an individual candidate trajectory and the quantity of occurrences of that candidate trajectory within the logs. Of the remaining candidate trajectories, they can be scored based both on a quantity of occurrences of each such candidate trajectory within the logs, as well as based upon a quantity of steps in each candidate trajectory. Highly scored candidate trajectories, therefore, can represent sequences of events that both occur with sufficient regularity within the logged data, and are of an increased length, thereby providing actionable feedback. As an optimization, prior to the generation of a graph from the logs, the logs can be filtered to remove attributes whose values lack repetition or are otherwise too uniquely or evenly spread out to facilitate efficient analysis.

The techniques described herein make reference to "events" and "trajectories". As utilized herein, the term "event" means any action on the part of a user or a computing device that is separately logged in the form of values for each of multiple attributes being logged. Thus, as utilized herein, the term "event" includes transactions between a user and a computing device, or between multiple computing devices, the presentation of resources, either to users or to other computing devices, the exchange of messages, or other discrete communications, between users, computing devices, or between one or more users and one or more computing devices, or the failures thereof, such as exceptions, and other like events. As utilized herein, the term "trajectory" means a sequence of events occurring in a conceptually adjacent manner such that a subsequent event is conceptually adjacent to a prior event in the trajectory. As utilized herein, the term "conceptually adjacent" means a connected relationship between two events such that, for one or more specific partitioning attributes, the two events have no intervening events. Thus, an example of conceptually adjacent events, for the specific partitioning attribute of a user identifier, are two events that are performed by the same user, identified by the user identifier, one after another in either a temporal or causational manner such that no logged events were performed by that same user between the two events. Another example of conceptually adjacent events, for the specific partitioning attribute of a session identifier, are two events that a logged sequentially as part of that same session, identified by the session identifier, such that no logged events of that same session were logged in a sequential manner between the two events. Further to the definition of conceptually adjacent, as utilized herein, the term "temporally adjacent" means two conceptually adjacent events, as that term is defined above, where the adjacency is determined along a timeline metric such that there are no temporally intervening events between the time when the first of the two temporally adjacent events occurs and the time when the second of the two temporally adjacent events occurs.

Although not required, the description below will be in the general context of computer-executable instructions, such as program modules, being executed by a computing device. More specifically, the description will reference acts and symbolic representations of operations that are performed by one or more computing devices or peripherals, unless indicated otherwise. As such, it will be understood that such acts and operations, which are at times referred to as being computer-executed, include the manipulation by a processing unit of electrical signals representing data in a structured form. This manipulation transforms the data or maintains it at locations in memory, which reconfigures or otherwise alters the operation of the computing device or peripherals in a manner well understood by those skilled in the art. The data structures where data is maintained are physical locations that have particular properties defined by the format of the data.

Generally, program modules include routines, programs, objects, components, data structures, and the like that perform particular tasks or implement particular abstract data types. Moreover, those skilled in the art will appreciate that the computing devices need not be limited to conventional personal computers, and include other computing configurations, including hand-held devices, multi-processor systems, microprocessor based or programmable consumer electronics, network PCs, minicomputers, mainframe computers, and the like. Similarly, the computing devices need not be limited to stand-alone computing devices, as the mechanisms may also be practiced in distributed computing environments where tasks are performed by remote processing devices that are linked through a communications network. In a distributed computing environment, program modules may be located in both local and remote memory storage devices.

Figure 1:
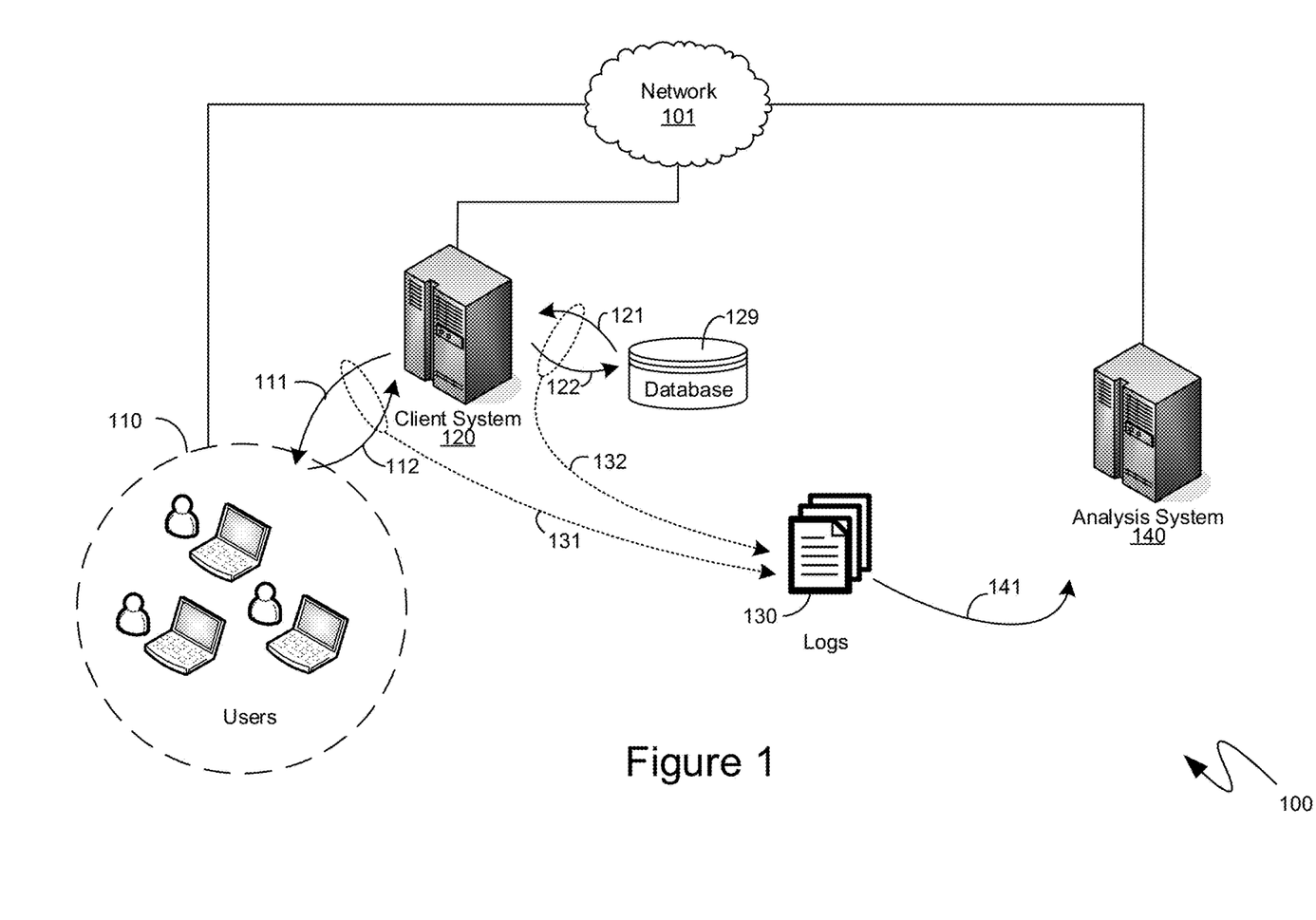
FIG. 1 is a system diagram of an exemplary system for utilizing artificially created dominant sequences that are representative of logged events.

With reference to FIG. 1, an exemplary system 100 is illustrated, providing context for the descriptions below. The exemplary system 100 can be used to illustrate any number of data transfer systems operating in both a wide area or local network 101. These networks 101 connect one or more users 110 to a client system 120. Users 110 can access the client system 120 from any form of computing device that allows remote or digital connection to a network 101. A client system 120 can be include, but not limited to, a website domain, local management systems, game device systems, communication networks and the like. Users 110 access the client system 120 through the network 101 and can either enter information through the upload of data 112 or can receive responses from the client system 120 in the form of downloaded data 111. Events that occur during the download of data 111 and upload of data 112 are unique with reference to the summation of all data contained within those events. For example, if the same user 110 performed the same operation on the same client system 120, accessing the same webpages and requested the same information to download, these events would be separated by the time at which they occur.

The client system 120 can interact with external or internal databases, such as the exemplary database 129 through further download of data 121 and upload of data 122. The database 129 can include information having, but not limited to, pricing information, reference directories, geographical information, text files, multimedia content, or image files. The database 129 can be accessed via the client system using either local or remote communicational connections. The local storage of the database files 129 can independent of the client system 120 or it can be part of the client system 120.

The download of data 111,121 and upload of data 112,122 can be tracked through data logs 130. Data logs 130 can be large collections of columns of information that record markers, attributes, values, or other identifying information about the events triggering, or resulting in, the download of data 111, 121 and upload of data 112, 122. According to one aspect, the logs 130 can be analyzed to identify trends, failure vectors, or otherwise obtain summary data therefrom which can be utilized to improve the functioning of the client system 120, improve the functionality being exposed by the client system 120 to the users 110, increase user engagement with the client system 120, or combinations thereof.

Log files 130 can be accessed via the analysis system 140 in order to analyze application health and quality of applications or processes hosted by the client system 120, the interactions of the users 110 with client system 120, the operation of the database 129, or other like events. The log files store can comprise information including, but not limited to, the geographical data, application version, error codes, operating system and version, device type, and time of access and other logged information. The log files 130 can be stored as multiple tables or table-like structures that organize and store the information gathered from the events. It is common in large scale applications or client systems 120 for the quantity of data stored in these logs 130 to be extremely large, requiring high computing power or time in order to perform analysis on the data. Such analysis typically used on the log files includes root cause analysis, telemetry failures, or performance metrics related to a promised level of quality, such as in hosted systems. The analysis system 140 can be communicationally coupled to the same network 101 as the client system 120 and users 110, and can receive the logs 130 via communications through the network 101. Alternatively, the logs 130 can be provided through other data communication mechanisms, including the physical coupling of one or more of the computing devices of the analysis system 140 to one or more storage media comprising the logs 130.

As an example, a user 110 accessing the client system 120, in the form of a provider of online services, could create entries in the logs 130 by, for example, submitting a keyword query search in the system and then browsing one or more results returned by the client system 120. Each entry could, then, comprise an identification of the user, a time stamp, a version of an operating system currently executing on the computing device being utilized by the user to access the client system 120, a version of a browser executing on the computing device and through which the user is accessing the client system 120, a resource requested by the user, such as a specific web page, web address, or other like resource identifier, and other identifying or log-able information, including information generated by the client system 120, such as a duration of processing to respond to the user's request, a quantity of memory consumed in responding to the user's request, as well as identifiers generated to uniquely identify each entry in the logs 130. According to one aspect, the specific attributes to be logged can be determined in advance. Each entry in the logs 130, therefore, can be comprised of values for those attributes. Conceptually, the logs 130 can be visualized as tables, with the attributes being the headings of individual columns, and each row being a separately logged event. As will be recognized by those skilled in the art, however, the actual structure of the data, as stored on storage media, within the logs 130, need not be in tabular form.

The analysis system 140 can be part of the same local network of the client system 120 and database 129, can be part of the same computing device or set of computing devices acting in aggregate that also host the client system 120, the database 129, or combinations thereof, or can be remote from one or both of the client system 120 and database 129. The network 101 can provide a communicational connection between the client system 120, the database 129, and the analysis system 140.

Figure 2:
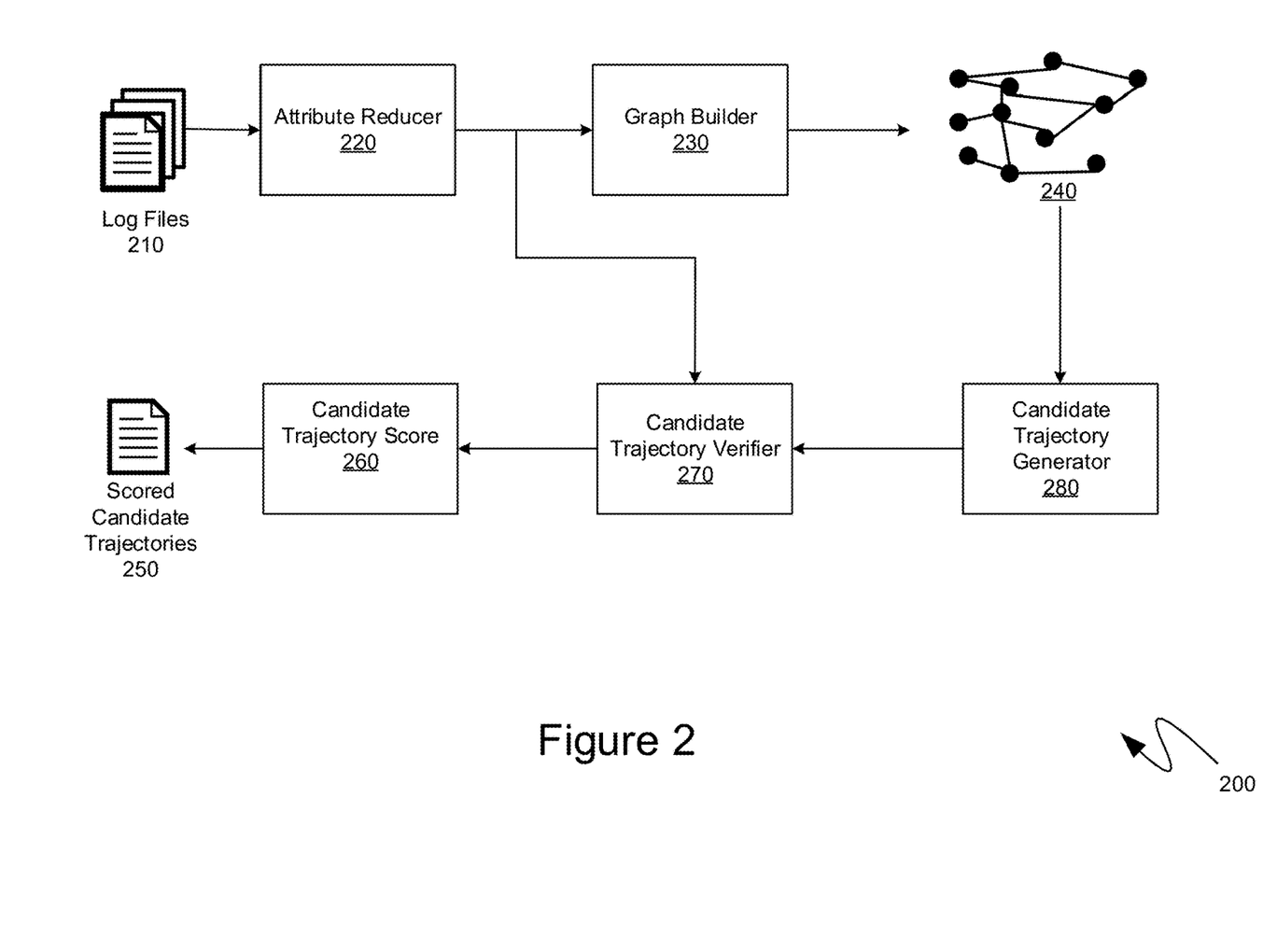
FIG. 2 is a block diagram of an exemplary system for artificially creating dominant sequences that are representative of logged events.

With reference to FIG. 2, a block diagram 200 illustrates an exemplary set of components that can create dominant sequences of logged events in the form of candidate trajectories. The output of the system 200 can be the scored candidate trajectories 250 that can be representative of the larger population of data in the log files 210, but in a format that is more easily consumable and analyzable to identify sequences of interest. This can be accomplished through reducing the number of attributes and creating a graph, such as the graph 240, from which candidate trajectories can be artificially generated and then verified prior to being scored.

Initially, after the log files 210 are obtained, an attribute reducer, such as the exemplary attribute reducer 220, can remove certain attributes to reduce the quantity of data to be analyzed. This can increase the speed at which following computations can be performed, as a reduction in the amount of data being analyzed reduces the burden on the cores of the CPU. Attributes to be removed can be identified by applying a threshold value upon the distinctness of attribute values, such as, for example, by comparing a quantity of unique attribute values to a total quantity of log entries. For example, if each logged event had assigned to it a unique identifier, then the quantity of unique values of such an identifier can be the same as the quantity of log entries themselves. Accordingly, such an attribute can be removed by the attribute reducer 220. As another example, if each logged event included an indication of an operating system type, there may be only a half-dozen or so unique values even though the quantity of log entries could be tens of thousands or more. Because the ratio of unique values of such an attribute as compared with the total quantity of log entries is low, that attribute can be retained by the attribute reducer 220.

Another filtering option to reduce the quantity of data is to apply a filtering option based on a quantity of a most common attribute value as compared with a total quantity of log entries. More specifically, individual rows, or entries, can be sorted based on attribute values such that attribute values of an attribute being analyzed, that are equivalent to one another, can be sorted adjacent to one another. Quantities of equivalent attribute values can then be tallied and the quantity of the most commonly occurring attribute value can be compared with a total quantity of entries in the logs. If such a ratio is too low, suggestive of many unique values of such an attribute, that attribute can be removed by the attribute reducer 220. Sorting in this method could place all of the most commonly occurring events at the top of the sorting filter by the desired attribute and placing all of the fewer occurring events at the bottom. This sorting method would, again, facilitate the removal of data based on attributes whose values are not sufficiently repetitive among the individual log entries.

The filtering performed by the exemplary attribute reducer 220 can remove both non-discrete event attributes and unique events. Examples of data that may be removed include, but are not limited to, the keys, indexes, time stamps and the like. Such data can be inherently unique to each event and may not relate to subsequent events being analyzed for trajectories. Removing these columns of data can reduce the computation required for analysis.

In addition to removing whole attributes, analogous to removing whole columns from a table, the exemplary attribute reducer 220 can also remove individual attribute values while still retaining the conceptual column. Again, the reduction of data can aid in the efficiency of subsequent processing.

Subsequently, a graph builder, such as the exemplary graph builder 230, can build graph from the log entries, where such a graph can be built based on one or more specific partitioning attributes that delineate a framework within which logged events will be evaluated to determine whether or not they are conceptually adjacent to one another for purposes of connecting, with edges between them, pairs of nodes of the graph, where the graph itself is comprised of the nodes and the connecting edges. Nodes can be denoted to be a unique attribute-value pair, while the edges can represent a progression from one node to another, the two nodes representing logged events that are conceptually adjacent within the framework of the one or more specific partitioning attributes. Nodes can be weighted by the quantity of events having that specific attribute-value pair that are processed by the graph builder 230 and edges can be weighted by the quantity of progressions along such an edge by the events from the log files 210 that are processed by the graph builder 230.

As an example, a partitioning attribute can be a user identifier, such that each user's logged events are viewed independently of another user's logged events for purposes of building the graph and an attribute, whose attribute-value pairs can define nodes, may be a resource, such as a web page address, accessed or requested by a user having a specific user identifier. An individual node, in such an example, can be a specific value for that attribute, such as a specific resource. Thus, if the log files 210 contained an entry of that specific resource being requested, such an entry can cause the graph builder 230 to either create a node corresponding to that attribute-value pair, namely with the attribute being requested resources and the value being the specific resource requested by that entry, or to increment a count of such a node if that node already exists in the graph 240, such as by the graph builder 230 having created it previously. Another entry from the log files 210, logging the request of another, different resource, can result in the creation of, or in incrementing the count of, another node. If the two nodes are conceptually adjacent within the framework of the one or more specific partitioning attributes, such as if there is a temporal or causational relationship between the two nodes within the framework of a specific user, such as if the same user first requested one resource and then requested another without any other resource request event being logged temporally between those two, an edge can be created between those two nodes by the graph builder 230, or a count of an already existing edge can be incremented. Edges that connect to and from nodes can show temporal connections and trajectories related to the nodes, such as which resources were requested after which other resources by a single user. For example, if the second resource was requested from the first resource, such as by following a hyperlink, such an action can indicate a causational relationship between the two nodes corresponding to the requesting of the first resource and then subsequently the second resource and, correspondingly, the graph builder 230 can generate, or increment the count of, an edge between the corresponding nodes. As another example, if the second resource was requested by the same user immediately after that user requested the first resource, with the term "immediately" being utilized to mean that there were no intervening logged resource requesting events from that same user, such an action can also indicate a causational relationship between the two nodes corresponding to the requesting of the first resource and then subsequently the second resource.

The graph data 240 that is generated is represented by nodes, marking events that have occurred, and edges, marked the trajectories from one event to another. Such a representation of the data can be show the frequency of specific events, or values within attributes, and the likelihood of said event leading to another, or the trajectory which it is most likely to follow. The nodes are attribute-value pairs corresponding to events registered in logged files and the edges are temporal or causational connections between such events, relating changes in attribute-value pairs. Edges may be expressed in a weighting scale dependent upon the frequency of occurrence over the amount of data analyzed, such as a probability determined through the weighting of all other nodes to which edges proceed from that particular node.

As an example, denoting requested resources as variable letters, a user interacting with a system can request a resource A and can then proceeds to request a resource B. Another user, with a different unique user ID, can also accesses resource A, but instead can proceed to resource C, instead of B. A graph representation of this example, with user identifiers being the specific partitioning attribute within which framework the graph is being generated, could comprise a node corresponding to the resource A, with a count, or value, of two and with edges leading to nodes corresponding to the resources B and C, each with a weight or count of one. Thus, of the edges departing the node corresponding to resource A, fifty percent proceed to the node corresponding to the resource B and fifty percent proceed to the node corresponding to the resource C. These values can be represented as either population numbers, or weights, or percentages related to the total population of events analyzed.

Following the development of the graph 240, a candidate trajectory generator, such as the exemplary candidate trajectory generator 280 can utilize the graph 240 to artificially generate candidate trajectories through the graph 240. These candidate trajectories are generated to perform, what are referred to herein as, "random walks". Random walks are comprised of an ordered sequence of nodes from the graph 240 such that, conceptually, the "walk" is seen as progressing from one "step" to another, where each "step" is a node and where the next node is connected to the prior node by an edge. The "walks" are "random" in that they can commence on a randomly selected node, they can proceed in a random manner to a subsequent node, in accordance with the weighting described previously, and can terminate after a random quantity of nodes, or "steps".

The candidate trajectory generator 280 can initiate the formation of candidate trajectories over the nodes by selecting a random node as a starting point for one such candidate trajectory, generating the candidate trajectory, as detailed below, then selecting another random node as a starting point for the next candidate trajectory, and so on. Starting nodes can be randomly selected according to the frequency of the events in the raw data, or a weighted sampling of the discrete attributes. Thus, for example, a node that has a count or weighting that is twice that of another node can be randomly selected approximately twice as often as an initial, starting node for a candidate trajectory. Alternatively, the randomly selected nodes, selected to start individual candidate trajectories, can be randomly selected from among some or all of the nodes in the graph 240 without regard to the previously determined weights or counts.

Following weighted percentages, likelihood of occurrences, and possible trajectories between nodes, the candidate trajectory generator 280 can follow edges randomly. More specifically, the randomly selected edge, leading from a current node in the candidate trajectory being constructed by the candidate trajectory generator 280, can be randomly selected based on a score or weight assigned to the edges leading from that current node. As an example, if beginning at a node and that node has two edges proceeding from it, one possessing a weight of ninety percent and the other of ten percent, then randomly proceeding forward ten times should result in the former edge being selected approximately nine times and the latter edge being selected approximately once. As will be recognized by those skilled in the art, this is not a guarantee, as weighting only predicts the possibility and is not meant to be seen as a guarantee of path of a candidate trajectory being generated by the candidate trajectory generator 280.

Aside from the first node in the trajectory generator, the number of steps can also be randomly chosen. The number of steps may be given an upper or lower limit which can be informed based on the nature of the log files 210, or can be adjusted based on previously generated candidate trajectories.

The candidate trajectories generated by the candidate trajectory generator 280 are artificially created sequences generated from the graph 240 and are not actual trajectories selected from the log files 210. In other words, the candidate trajectory generator 280 is not merely filtering the log files 210 themselves. Consequently, the candidate trajectories generated by the candidate trajectory generator 280 can be generated more efficiently than filtering of the log files 210, including consuming substantially less processor and memory resources, since, as indicated the log files 210 can comprise large data sets. Additionally, subsequent analysis of the candidate trajectories can also be performed more efficiently and, therefore, increase the efficiency of the scanning process of the logged data. This is due at least in part because the graph data 240 is small compared to the log files 210. The difference in size is noted to be smaller but can be controlled by thresholding the values of attributes. Lower thresholds can increase the size of the graph while higher thresholds can remove more information and therefore decrease the size of the graph, thereby also potentially decreasing the time to generate candidate trajectories 280, though possibly at the cost of reduced accuracy or completeness.

A candidate trajectory verifier, such as the exemplary candidate trajectory verifier 270, can receive the candidate trajectories from the candidate trajectory generator 280 and can further receive the logged data, such as after reduced by the attribute reducer 220, as illustrated by the system 200 of FIG. 2. The verifier 270 can test the validity of the candidate trajectories generated by the candidate trajectory generator 280 against the logged events to remove candidate trajectories that either have never occurred, as indicated by the logged events from the log files 210, or have occurred sufficiently infrequently that they are below a predetermined frequency threshold. Random walks along the generated candidate trajectories 280 can sometimes comprise a sequence of events, or steps, that is either impossible, or improbable. This can be due to the nature of the random walks beginning at randomly assigned nodes and proceeding along weighted edges. Further, edges represent only the temporal movement between values of an attribute logged. This may lead to values existing in attributes related to activity logged in another event. More specifically, a random walk through the graph 240 may generate a sequence of events that relates two nodes that cannot happen without the previous confirmation of a prior node that was not, actually part of the walk. As these trajectories are impossible to occur, they can be removed by the exemplary candidate trajectory verifier 270.

For example, a user who has requested a resource B can be provided the opportunity to request a resource C only if the user had requested the resource B from a prior resource X. Users who requested the same resource B from any other prior resource, such as the resource A, on the other hand, could not be allowed to request the resource C and would, instead, in such an illustrative example, only be allowed to request the resource Y. Thus, a node representative of the requesting of the resource B could have two edges proceeding from it, one to the node representing the resource C and another to the node representing the resource Y. Similarly, the node representing the resource B can have two edges terminating at such a node: one from the node representing the resource A and the other from the node representing the resource X. Again, in this example, X-B-C can be a valid sequence, since, in this example, a user who has requested the resource B can be provided the opportunity to request a resource C only if the user had requested the resource B from the resource X. Similarly, A-B-Y can, for the same reason, be a valid sequence. A random walk, however, starting at the node representing the resource A can randomly proceed to the node representing the resource B and can from there randomly proceed to the node representing the resource C, since the node representing the resource B has an edge originating from it and terminating at the node representing the resource C. However, as indicated, in this illustrative example, A-B-C can be an invalid sequence since only users requesting the resource B from the prior resource X can be allowed to request the resource C. Consequently, a comparison to the logged data, by the candidate trajectory verifier 270, can reveal that the candidate trajectory A-B-C never occurred within the logged data, since, again, in the present example, it can be an impossible trajectory, and, consequently, due to its lack of occurrence within the logged data, the candidate trajectory verifier 270 can filter out such a candidate trajectory.

Following the removal of candidate trajectories by the candidate trajectory verifier 270, a candidate trajectory score generation component, such as the exemplary candidate trajectory score generation component 260 can assign a ranking, or score, to at least some of the candidate trajectories remaining after the candidate trajectory verifier 270, and can output the scored candidate trajectories 250. According to one aspect, such a scoring, or ranking, can take into account the length of a candidate trajectory and a frequency of its occurrence. Trajectories, representing sequences of events, that have a greater number of steps can be more desirable, and thus, can be rated higher. The frequency of similar sequences of events, as logged in the log files 210, can also be rated higher. Thus, the most highly ranked candidate trajectories can represent those that occurred more often, and also are of a sufficiently long sequence of steps, or events, to enable usable optimizations or improvements of the client system to be gleaned therefrom. This process is not limited to finding errors in a client system 120 or database 129, but can also be used to predict the most likely trajectory users will take to reach a specific event, or other like analysis.

For example, an online supplier may use the exemplary system to analyze the events leading to access of a specific resource, or the failure to access a specific resource. The scored candidate trajectories 250 output by the candidate trajectory score generation component 260 can be utilized to identify the most likely mechanisms, and sequences of steps, by which that specific resource is accessed, or, conversely, the most likely sequence resulting in the failure to access that resource.

Figure 3:
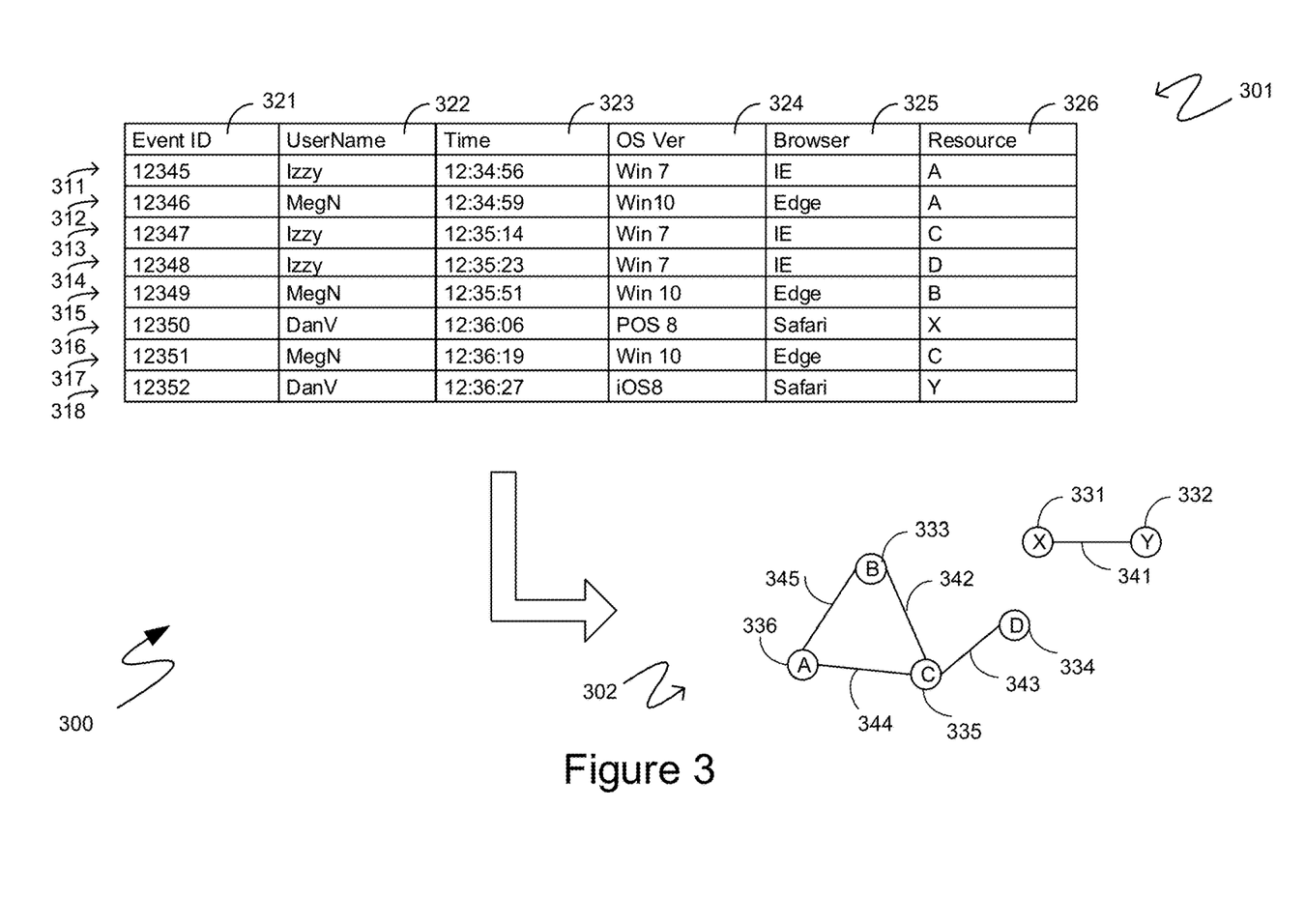
FIG. 3 is a block diagram of an exemplary logged data and corresponding generated graph.

Moving to FIG. 3, the system 300 illustrates one mechanism for generating a graph, such as the exemplary graph 302, from logged data, such as the exemplary logged data 301. Rows 311, 312, 313, 314, 315, 316. 317 and 318 can represent individual events logged, such as those more generally referenced above. Columns 321, 322, 323, 324, 325 and 326 can be logged attributes whose values are recorded for each event. The columns 321, 322, 323, 324, 325 and 326, therefore, can indicate attributes capable of being analyzed, but are exemplary only and are not requirements of the log files. Similarly, the attributes recorded can include, but are not limited to, date or time on resource acquisition, resource size and other like information. Though they are so illustrated in the exemplary system 300, the rows 311, 312, 313, 314, 315, 316. 317 and 318 of example log data 301 are not required to have values for all attributes listed in columns 321, 322, 323, 324, 325 and 326. For example, if an additional column were created to reference an error code created via a user created event, the value of the column could be blank or filled in with a non-discrete marker to indicate no such error occurred during the logged event.

The graph 302 can illustrate the creation of a graph, namely the graph 302, that is representative of the logged data 301 based on a specific partitioning attribute, such as in the manner of the graph generation described above. The figures presented in the graph 302 can represent an example analysis of the resource column 326 with the UserName attribute from the UserName column 322 acting as the partitioning attribute. More specifically, nodes 331, 332, 333, 334, 334, 335 and 336 can be representative of events from the resource column 326 as sequentially requested by discrete users identified based on the UserName attribute. The graph 302 can further have temporal edges 341, 342, 343, 344 and 345 representative of the trajectory of attribute-value nodes, showing the trajectory of events from logged data 301, whose conceptual adjacency can be derived from the logged data, such as from the time attribute 323 in combination with the partitioning attribute.

Events from logged data 301 rows 311, 312, 313, 314, 315, 316. 317 and 318 show that resource column 326, having values generically denoted "X" and "Y" can be temporally linked in that a same user, as indicated by values in the UserName column 322, which, again, is the partitioning attribute, is temporally associated with the access of both the resources "X" and "Y". Similarly, resource column 326, having values generically denoted "A", "B", "C" and "D" can be temporally linked in that a same user, as indicated by values in the UserName column 322, which is the partitioning attribute in the present example, is temporally associated with their access. For example, the user nominated by the UserName value "Izzy", shown in event rows 311, 313 and 314 can be seen as initially requesting resource A, as illustrated by event row 311, then proceeding to request resource C, as illustrated by event row 313, and, subsequently, requesting resource D, as illustrated by event row 314. In the graph 302, therefore, nodes 334, 335 and 336 can represent the events logged with Izzy's UserName, namely the requesting of the resources A, C and D, respectively, and edges 344 and 343 can represent the trajectory of the events present in the logged data 301, as detailed previously. As another example, the user nominated by the UserName value "DanV", can, as illustrated by event rows 316 and 318 initially request the resource X and can subsequently request the resource Y. These are represented with nodes 331 and 332, respectively and a single edge 341. As yet another example, the user nominated by the UserName value "MegN", can, as illustrated by event rows 312, 315 and 317, also initially request the resource A, much like user Izzy did, as logged by event row 311, but the user MegN can then subsequently request the resource B, instead of the resource C that was subsequently requested by the user Izzy, and can only then proceed to request the resource C, as illustrated by event row 317. The exemplary graph 302, therefore, illustrates an edge 344 from node 336 to node 335, and also an edge 345 from node 336 to node 333. The exemplary graph 302 also illustrates an edge 342, then, from the node 333 to the node 335.

Figure 4:
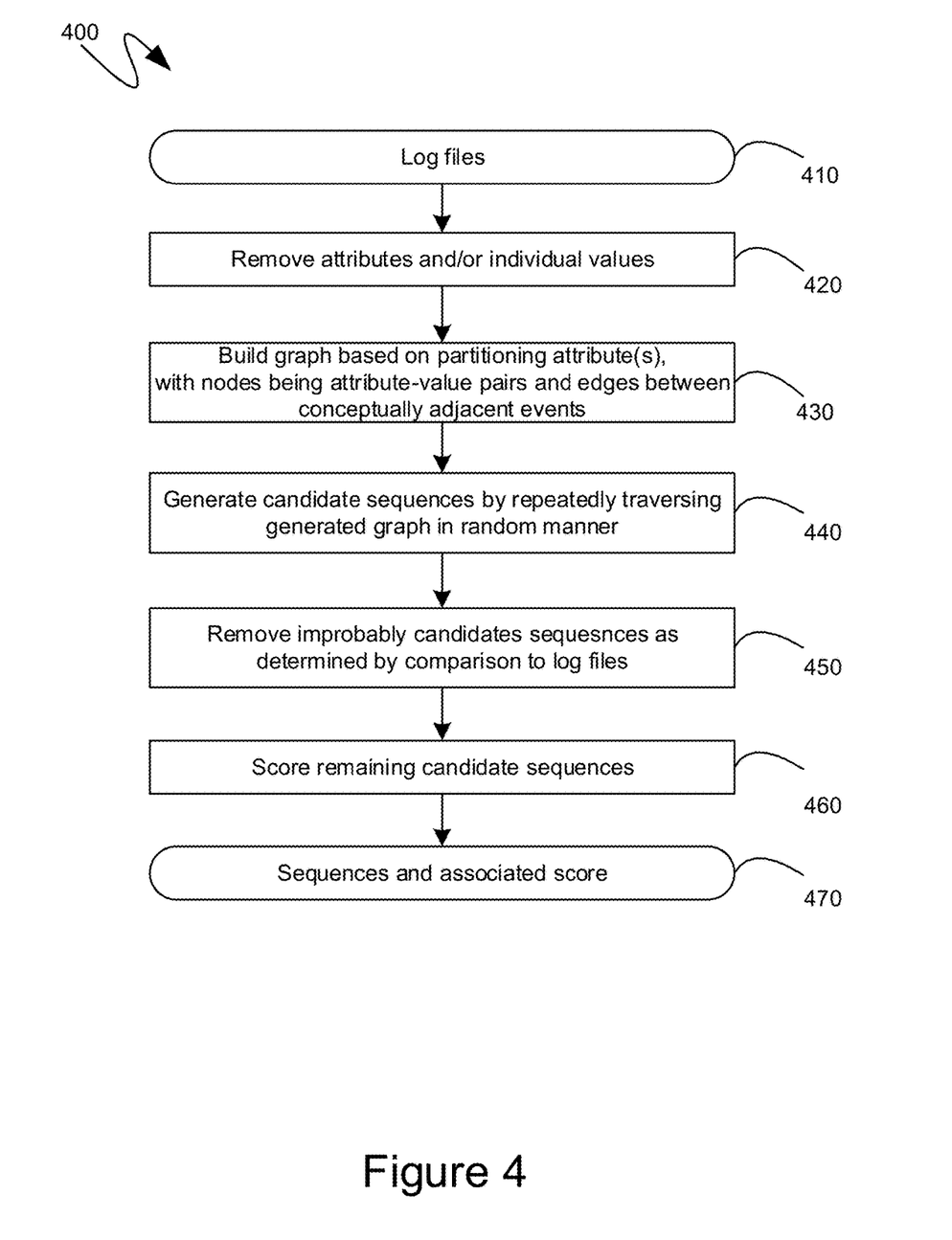
FIG. 4 is a flow diagram of an exemplary series of steps by which dominant sequences that are representative of logged events can be artificially created.

Referring to FIG. 4, a flow diagram 400, of an exemplary sequence of steps for artificially creating dominant sequences that are representative of logged events, is shown. Initially, at step 410, one or more log files can be received. The log files received at step 410 may be events relating to users, client systems, databases and other like events, such as those described previously. The log files received at step 410 can contain a terminology of events, summarized as a transaction between the users, client system, and database. An analysis system is able to bring these files together for the processing of the data as described previously and herein. The removal of the attributes at step 420 can follow, in which non-discrete datasets and values can removed from the compilation of log files in order to reduce the resources required to process the data and remove inapplicable, or incompatible data. Data sets may also be removed based on, but not limited to, thresholding values that occur below a given percent of the total attribute population, unique events or markers that do not offer significance to the events, or are classified as unimportant to the attribute being analyzed. The method of filtering and limitations therein are to be made and used at the operator's discretion.

The data follows the flow chart 400 to a building graphs step 430, where a graph comprising nodes and edges can be built from the logged data, subsequent to the step 420, based on a partitioning attribute that defines the framework within which logged events will be evaluated to determine whether or not they are conceptually adjacent to one another for purposes of connecting, with edges between them, pairs of nodes of the graph, where the graph itself is comprised of the nodes and the connecting edges. As indicated previously, each node in the graph constructed at step 430 can correspond to an attribute-value pair and each edge between nodes can indicate two or more events that are conceptually adjacent as that term was explicitly defined above. These nodes and edges can be weighted based upon their incidence and quantity of appearance in the logged data. That is, if an attribute-value pair occurs multiple times in the logged data, the corresponding node can be weighted, or scored, accordingly, and, analogously, if multiple different sequences of events indicate that an event corresponding to a first node and an event corresponding to a second node are conceptually adjacent, then the edge between them can be weighted, or scored, accordingly, as detailed above. The system can generate the nodes first through the comparison of all values in the desired attribute, then creating the edges by walking through events, plotting conceptually adjacent sequences. New edges can be created when new sequences are discovered through the random walking of the graph data set. Alternatively, the system can create the edges and nodes concurrently through a sequential analysis of the logged data. Values, or counts of occurrence, of edges and nodes can be represented as either percentages of the total population or as discrete quantities or weights.

Subsequently, at step 440, the graph generated at step 440 can be traversed in a random manner to generate candidate trajectories. That is, a series of trajectories can begin at any node, selected randomly, and continue for a randomly specified number of steps, herein referring to the number of edges the trajectory moves across. The path of these trajectories can adhere to the percentage likelihood of occurrence, related to the weighting of the edges between respective nodes. For example, as illustrated previously, if the trajectory begins at node A ten times and is offered to travel along one edge towards node B, which occurs ninety percent of the time, and node C, which occurs ten percent of the time, the trajectory can, randomly be selected to proceed to node B approximately nine times and to node C approximately once. The initial node at which the trajectory begins can be selected at random and either can be based on weighting, or scores, applied to individual nodes, or can be weight agnostic. Similarly, the initially selected node can be selected from a defined subset or from the entire graph. It is to be noted that due to the nature to which this algorithm can be applied, it is possible for candidate trajectories to be generated and be impossible for the system to replicate. This is due to the nature of starting in nodes previously accessed through only a specific order of nodes or accessing nodes in the random sequencing which require another node not accessed.

The removal of improbable or impossible trajectories generated at step 440 can be performed at step 450. The trajectories generated at step 440 can, at step 450, be compared to the logged data received at step 410. This second scan may compare the trajectories generated to the trajectories existing within the data. The removal of trajectories is not limited to impossible trajectories, or trajectories that never occur within the logged data received at step 410. Trajectories may also be removed for failing to appear in the logged data greater than a threshold quantity of times.

Following the removal of the trajectories, a score can be assigned for the remaining candidate trajectories at step 460. This score can be based upon the number of times a given trajectory occurred within the logged data received at step 410, the number of steps taken within said trajectory, or combinations thereof. A greater number of steps in a trajectory can be perceived to increase its ultimate value as an analysis instrument, as it represents greater data to be understood by the analysis system and its operator. This information can be stored and subsequently output as trajectories and their associated score at step 470.

Figure 5:
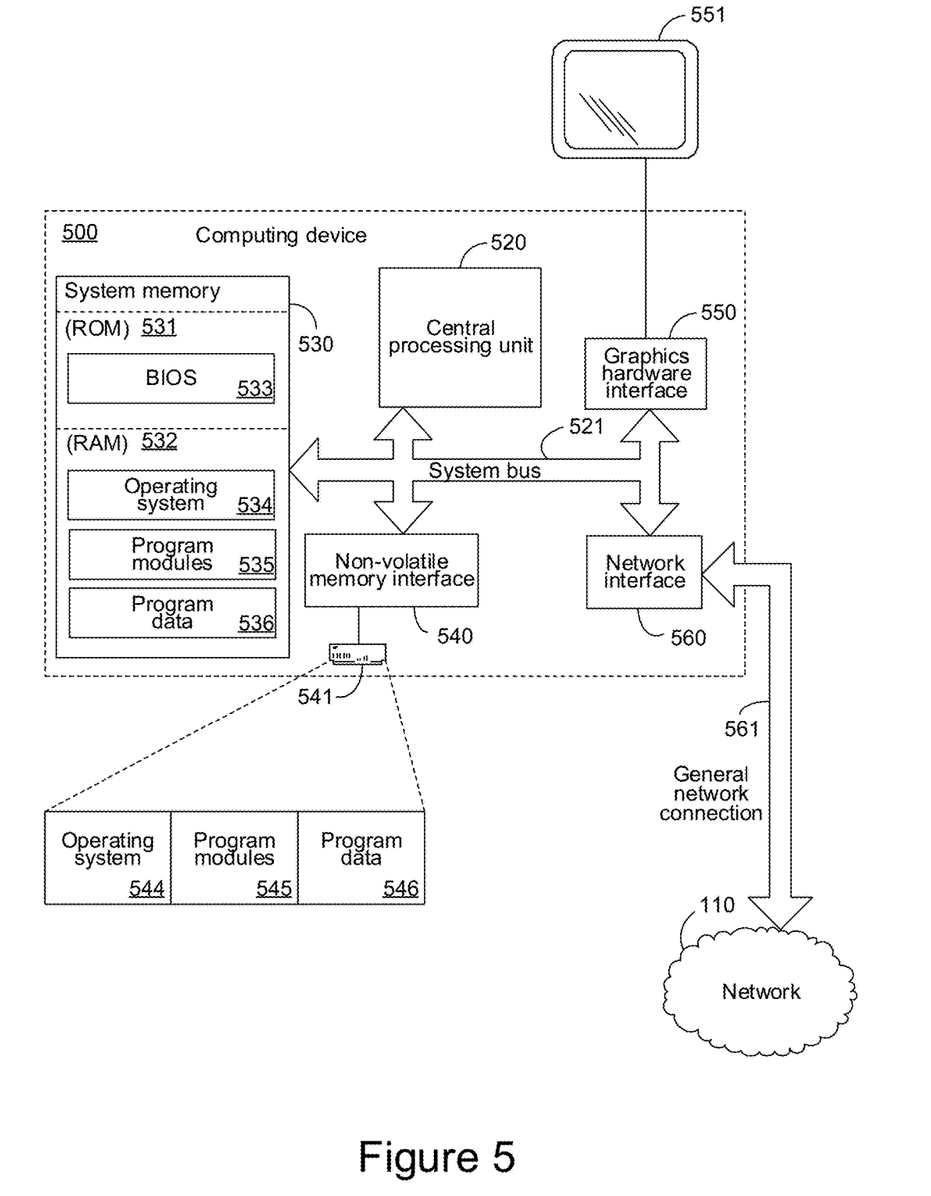
FIG. 5 is a block diagram of an exemplary computing device.

Turning to FIG. 5, an exemplary computing device 500 is illustrated which can perform some or all of the mechanisms and actions described above. The exemplary computing device 500 can include, but is not limited to, one or more central processing units (CPUs) 520, a system memory 530, and a system bus 521 that couples various system components including the system memory to the processing unit 520. The system bus 521 may be any of several types of bus structures including a memory bus or memory controller, a peripheral bus, and a local bus using any of a variety of bus architectures. The computing device 500 can optionally include graphics hardware, including, but not limited to, a graphics hardware interface 570 and a display device 571, which can include display devices capable of receiving touch-based user input, such as a touch-sensitive, or multi-touch capable, display device. Depending on the specific physical implementation, one or more of the CPUs 520, the system memory 530 and other components of the computing device 500 can be physically co-located, such as on a single chip. In such a case, some or all of the system bus 521 can be nothing more than silicon pathways within a single chip structure and its illustration in FIG. 5 can be nothing more than notational convenience for the purpose of illustration.

The computing device 500 also typically includes computer readable media, which can include any available media that can be accessed by computing device 500 and includes both volatile and nonvolatile media and removable and non-removable media. By way of example, and not limitation, computer readable media may comprise computer storage media and communication media. Computer storage media includes media implemented in any method or technology for storage of content such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired content and which can be accessed by the computing device 500. Computer storage media, however, does not include communication media. Communication media typically embodies computer readable instructions, data structures, program modules or other data in a modulated data signal such as a carrier wave or other transport mechanism and includes any content delivery media. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 530 includes computer storage media in the form of volatile and/or nonvolatile memory such as read only memory (ROM) 531 and random access memory (RAM) 532. A basic input/output system 533 (BIOS), containing the basic routines that help to transfer content between elements within computing device 500, such as during start-up, is typically stored in ROM 531. RAM 532 typically contains data and/or program modules that are immediately accessible to and/or presently being operated on by processing unit 520. By way of example, and not limitation, FIG. 5 illustrates operating system 534, other program modules 535, and program data 536.

The computing device 500 may also include other removable/non-removable, volatile/nonvolatile computer storage media. By way of example only, FIG. 5 illustrates a hard disk drive 541 that reads from or writes to non-removable, nonvolatile magnetic media. Other removable/non-removable, volatile/nonvolatile computer storage media that can be used with the exemplary computing device include, but are not limited to, magnetic tape cassettes, flash memory cards, digital versatile disks, digital video tape, solid state RAM, solid state ROM, and other computer storage media as defined and delineated above. The hard disk drive 541 is typically connected to the system bus 521 through a non-volatile memory interface such as interface 540.

The drives and their associated computer storage media discussed above and illustrated in FIG. 5, provide storage of computer readable instructions, data structures, program modules and other data for the computing device 500. In FIG. 5, for example, hard disk drive 541 is illustrated as storing operating system 544, other program modules 545, and program data 546. Note that these components can either be the same as or different from operating system 534, other program modules 535 and program data 636. Operating system 544, other program modules 545 and program data 546 are given different numbers hereto illustrate that, at a minimum, they are different copies.

The computing device 500 may operate in a networked environment using logical connections to one or more remote computers. The computing device 500 is illustrated as being connected to the general network connection 561 through a network interface or adapter 560, which is, in turn, connected to the system bus 521. In a networked environment, program modules depicted relative to the computing device 500, or portions or peripherals thereof, may be stored in the memory of one or more other computing devices that are communicatively coupled to the computing device 500 through the general network connection 561. It will be appreciated that the network connections shown are exemplary and other means of establishing a communications link between computing devices may be used.

Although described as a single physical device, the exemplary computing device 500 can be a virtual computing device, in which case the functionality of the above-described physical components, such as the CPU 520, the system memory 530, the network interface 560, and other like components can be provided by computer-executable instructions. Such computer-executable instructions can execute on a single physical computing device, or can be distributed across multiple physical computing devices, including being distributed across multiple physical computing devices in a dynamic manner such that the specific, physical computing devices hosting such computer-executable instructions can dynamically change over time depending upon need and availability. In the situation where the exemplary computing device 500 is a virtualized device, the underlying physical computing devices hosting such a virtualized computing device can, themselves, comprise physical components analogous to those described above, and operating in a like manner. Furthermore, virtual computing devices can be utilized in multiple layers with one virtual computing device executing within the construct of another virtual computing device. The term "computing device", therefore, as utilized herein, means either a physical computing device or a virtualized computing environment, including a virtual computing device, within which computer-executable instructions can be executed in a manner consistent with their execution by a physical computing device. Similarly, terms referring to physical components of the computing device, as utilized herein, mean either those physical components or virtualizations thereof performing the same or equivalent functions.

The descriptions above include, as a first example a set of one or more computing devices, in aggregate comprising: one or more processing units; and one or more computer-readable media comprising computer-executable instructions which, when executed by the one or more processing units, cause the set of computing devices to: receive one or more logs that comprise values of predefined attributes and, thereby, log multiple discrete events, wherein a single discrete event is logged with a single value for each of at least some of the predefined attributes; generate, from at least some of the received one or more logs, a graph comprising multiple nodes and edges between pairs of nodes, each node representing a unique attribute-value pair; produce a set of candidate trajectories, each candidate trajectory representing a sequence of events, by repeatedly traversing the generated graph starting from a randomly selected node and randomly proceeding to subsequent nodes, in accordance with edge values; generate a filtered set of candidate trajectories by removing candidate trajectories which, when compared with at least some of the received one or more logs, occur in the at least some of the received one or more logs less than a threshold amount; and provide, as output responsive to the receipt of the one or more logs, at least some of the filtered set of candidate trajectories, wherein each provided candidate trajectories is associated with a score based on a quantity of steps in the provided candidate trajectory and a quantity of occurrences of the provided candidate trajectory in the at least some of the received one or more logs.

A second example is the set of computing devices of the first example, wherein the one or more computer-readable media comprise further computer-executable instructions, which, when executed by the one or more processing units, cause the set of computing devices to: remove one or more of the predefined attributes, and the corresponding values, from the one or more logs prior to the generating the graph; wherein the graph is generated from the at least some of the received one or more logs after the removed one or more predefined attributes are removed therefrom.

A third example is the set of computing devices of the second example, wherein the removed one or more predefined attributes are selected to be removed because a quantity of different values of each of the removed one or more predefined attributes exceeds a threshold.

A fourth example is the set of computing devices of the second example, wherein the one or more computer-readable media comprise further computer-executable instructions, which, when executed by the one or more processing units, cause the set of computing devices to: remove one or more values of the predefined attributes that remain as part of the received one or more logs after the removed one or more predefined attributes are removed therefrom.

A fifth example is the set of computing devices of the first example, wherein the computer-executable instructions for generating the graph comprise computer-executable instructions, which, when executed by the one or more processing units, cause the set of computing devices to: identify a first event within the received one or more logs; identify, within the received one or more logs, a second event that is conceptually adjacent to the first event given at least one partitioning attribute that delineates a framework within which logged events are evaluated to determine whether or not they are conceptually adjacent to one another; generate a first node corresponding to the first event, if not already generated; generate a second node corresponding to the second event, if not already generated; generate a first edge from the first node to the second node, if not already generated; and increment a count associated with the first edge if already generated.

A sixth example is the set of computing devices of the fifth example, wherein the identification of the second event as being conceptually adjacent to the first event is based on a same user participating in the first event and then immediately subsequently participating in the second event, the immediately subsequently being determined by reference to a time attribute from the received one or more logs, the at least one partitioning attribute being a user identifying attribute by which the same user is distinguished from other users.

A seventh example is the set of computing devices of the fifth example, wherein the first event is a presentation of a first resource to a user and the second event is a presentation of a second resource to the same user, the at least one partitioning attribute being a user identifying attribute by which the same user is distinguished from other users.

An eighth example is the set of computing devices of the seventh example, wherein the first resource is a first web resource and the second resource is second web resource requested by the user through the first web resource.

A ninth example is the set of computing devices of the first example, wherein the computer-executable instructions for producing the set of candidate trajectories comprise computer-executable instructions, which, when executed by the one or more processing units, cause the set of computing devices to traverse, for each candidate trajectory in the set of candidate trajectories, the generated graph for a random quantity of steps, the random quantity of steps being determined prior to commencing the traversal of the generated graph for that candidate trajectory.

A tenth example is the set of computing devices of the ninth example, wherein the traversal of the generated graph ends at a node having no edges departing therefrom, even if the random quantity of steps has not yet been fully taken.

An eleventh example is the set of computing devices of the first example, wherein the score is exponentially higher for incrementally greater quantities of steps.

A twelfth example is a method of artificially creating dominant sequences that are representative of logged events, the method comprising: receiving, at a set of one or more computing devices, one or more logs that comprise values of predefined attributes and, thereby, log the logged events, wherein a single discrete event is logged with a single value for each of at least some of the predefined attributes; generating, on the set of one or more computing devices, from at least some of the received one or more logs, a graph comprising multiple nodes and edges between pairs of nodes, each node representing a unique attribute-value pair; producing, with the set of one or more computing devices, a set of candidate trajectories, each candidate trajectory representing a sequence of events, by repeatedly traversing the generated graph starting from a randomly selected node and randomly proceeding to subsequent nodes, in accordance with edge values; generate, on the set of one or more computing devices, a filtered set of candidate trajectories by removing candidate trajectories which, when compared with at least some of the received one or more logs, occur in the at least some of the received one or more logs less than a threshold amount; and provide, from the set of one or more computing devices, as output responsive to the receipt of the one or more logs, at least some of the filtered set of candidate trajectories, wherein each provided candidate trajectories is associated with a score based on a quantity of steps in the provided candidate trajectory and a quantity of occurrences of the provided candidate trajectory in the at least some of the received one or more logs.

A thirteenth example is the method of the twelfth example, further comprising: removing one or more of the predefined attributes, and the corresponding values, from the one or more logs prior to the generating the graph; wherein the graph is generated from the at least some of the received one or more logs after the removed one or more predefined attributes are removed therefrom.

A fourteenth example is the method of the thirteenth example, wherein the removed one or more predefined attributes are selected to be removed because a quantity of different values of each of the removed one or more predefined attributes exceeds a threshold.

A fifteenth example is the method of the twelfth example, wherein the generating the graph comprises: identifying a first event within the received one or more logs; identifying, within the received one or more logs, a second event that is conceptually adjacent to the first event given at least one partitioning attribute that delineates a framework within which logged events are evaluated to determine whether or not they are conceptually adjacent to one another; generating a first node corresponding to the first event, if not already generated; generating a second node corresponding to the second event, if not already generated; generating a first edge from the first node to the second node, if not already generated; and incrementing a count associated with the first edge if already generated.

A sixteenth example is the method of the fifteenth example, wherein the identification of the second event as being conceptually adjacent to the first event is based on a same user participating in the first event and then immediately subsequently participating in the second event, the immediately subsequently being determined by reference to a time attribute from the received one or more logs, the at least one partitioning attribute being a user identifying attribute by which the same user is distinguished from other users.

A seventeenth example is the method of the fifteenth example, wherein the first event is a presentation of a first web resource to a user and the second event is a presentation of a second web resource to the same user, the second web resource being requested by the user through the first web resource, the at least one partitioning attribute being a user identifying attribute by which the same user is distinguished from other users.

An eighteenth example is the method of the twelfth example, wherein the producing the set of candidate trajectories comprises traversing, for each candidate trajectory in the set of candidate trajectories, the generated graph for a random quantity of steps, the random quantity of steps being determined prior to commencing the traversal of the generated graph for that candidate trajectory.

A nineteenth example is the method of the twelfth example, wherein the score is exponentially higher for incrementally greater quantities of steps.

A twentieth example is one or more computer-readable storage media comprising computer-executable instructions which, when executed by one or more processing units of a computing device, cause the computing device to: receive one or more logs that comprise values of predefined attributes and, thereby, log multiple discrete events, wherein a single discrete event is logged with a single value for each of at least some of the predefined attributes; generate, from at least some of the received one or more logs, a graph comprising multiple nodes and edges between pairs of nodes, each node representing a unique attribute-value pair; produce a set of candidate trajectories, each candidate trajectory representing a sequence of events, by repeatedly traversing the generated graph starting from a randomly selected node and randomly proceeding to subsequent nodes, in accordance with edge values; generate a filtered set of candidate trajectories by removing candidate trajectories which, when compared with at least some of the received one or more logs, occur in the at least some of the received one or more logs less than a threshold amount; and provide, as output responsive to the receipt of the one or more logs, at least some of the filtered set of candidate trajectories, wherein each provided candidate trajectories is associated with a score based on a quantity of steps in the provided candidate trajectory and a quantity of occurrences of the provided candidate trajectory in the at least some of the received one or more logs.

As can be seen from the above descriptions, mechanisms for artificially creating dominant sequences that are representative of logged events have been presented. In view of the many possible variations of the subject matter described herein, we claim as our invention all such embodiments as may come within the scope of the following claims and equivalents thereto.

We claim:

1. A set of one or more computing devices artificially creating dominant sequences that are representative of logged events, the set of one or more computing devices in aggregate comprising:
   one or more processing units; and
   one or more computer-readable media comprising computer-executable instructions which, when executed by the one or more processing units, cause the set of computing devices to:
   receive one or more logs that comprise values of predefined attributes and, thereby, log multiple discrete events, wherein a single discrete event is logged with a single value for each of at least some of the predefined attributes;
   generate, from at least some of the received one or more logs, a graph comprising multiple nodes and edges between pairs of nodes, each node representing a unique attribute-value pair;

produce a set of candidate trajectories, each candidate trajectory representing a sequence of events, by repeatedly traversing the generated graph starting from a randomly selected node and randomly proceeding to subsequent nodes for a random quantity of steps, in accordance with edge values;

generate a filtered set of candidate trajectories by removing candidate trajectories which, when compared with at least some of the received one or more logs, occur in the at least some of the received one or more logs less than a threshold amount; and provide, as output responsive to the receipt of the one or more logs, at least some of the filtered set of candidate trajectories, wherein each provided candidate trajectories is associated with a score based on a quantity of steps in the provided candidate trajectory and a quantity of occurrences of the provided candidate trajectory in the at least some of the received one or more logs.

2. The set of computing devices of claim 1, wherein the one or more computer-readable media comprise further computer-executable instructions, which, when executed by the one or more processing units, cause the set of computing devices to:

remove one or more of the predefined attributes, and the corresponding values, from the one or more logs prior to the generating the graph;

wherein the graph is generated from the at least some of the received one or more logs after the removed one or more predefined attributes are removed therefrom.

3. The set of computing devices of claim 2, wherein the removed one or more predefined attributes are selected to be removed because a quantity of different values of each of the removed one or more predefined attributes exceeds a threshold.

4. The set of computing devices of claim 2, wherein the one or more computer-readable media comprise further computer-executable instructions, which, when executed by the one or more processing units, cause the set of computing devices to:

remove one or more values of the predefined attributes that remain as part of the received one or more logs after the removed one or more predefined attributes are removed therefrom.

5. The set of computing devices of claim 1, wherein the computer-executable instructions for generating the graph comprise computer-executable instructions, which, when executed by the one or more processing units, cause the set of computing devices to:

identify a first event within the received one or more logs;

identify, within the received one or more logs, a second event that is conceptually adjacent to the first event given at least one partitioning attribute that delineates a framework within which logged events are evaluated to determine whether or not they are conceptually adjacent to one another;

generate a first node corresponding to the first event, if not already generated;

generate a second node corresponding to the second event, if not already generated;

generate a first edge from the first node to the second node, if not already generated; and increment a count associated with the first edge if already generated.

6. The set of computing devices of claim 5, wherein the identification of the second event as being conceptually adjacent to the first event is based on a same user participating in the first event and then immediately subsequently participating in the second event, the immediately subsequently being determined by reference to a time attribute from the received one or more logs, the at least one partitioning attribute being a user identifying attribute by which the same user is distinguished from other users.

7. The set of computing devices of claim 5, wherein the first event is a presentation of a first resource to a user and the second event is a presentation of a second resource to the same user, the at least one partitioning attribute being a user identifying attribute by which the same user is distinguished from other users.

8. The set of computing devices of claim 7, wherein the first resource is a first web resource and the second resource is a second web resource requested by the user through the first web resource.

9. The set of computing devices of claim 1, wherein the random quantity of steps is determined prior to commencing the traversal of the generated graph for that candidate trajectory.

10. The set of computing devices of claim 1, wherein the traversal of the generated graph ends at a node having no edges departing therefrom, even if the random quantity of steps has not yet been fully taken.

11. The set of computing devices of claim 1, wherein the score is exponentially higher for incrementally greater quantities of steps.

12. A method of artificially creating dominant sequences that are representative of logged events, the method comprising:

receiving, at a set of one or more computing devices, one or more logs that comprise values of predefined attributes and, thereby, log the logged events, wherein a single discrete event is logged with a single value for each of at least some of the predefined attributes;

generating, on the set of one or more computing devices, from at least some of the received one or more logs, a graph comprising multiple nodes and edges between pairs of nodes, each node representing a unique attribute-value pair;

producing, with the set of one or more computing devices, a set of candidate trajectories, each candidate trajectory representing a sequence of events, by repeatedly traversing the generated graph starting from a randomly selected node and randomly proceeding to subsequent nodes for a random quantity of steps, in accordance with edge values;

generating, on the set of one or more computing devices, a filtered set of candidate trajectories by removing candidate trajectories which, when compared with at least some of the received one or more logs, occur in the at least some of the received one or more logs less than a threshold amount; and providing, from the set of one or more computing devices, as output responsive to the receipt of the one or more logs, at least some of the filtered set of candidate trajectories, wherein each provided candidate trajectories is associated with a score based on a quantity of steps in the provided candidate trajectory and a quantity of occurrences of the provided candidate trajectory in the at least some of the received one or more logs.

13. The method of claim 12, further comprising:

removing one or more of the predefined attributes, and the corresponding values, from the one or more logs prior to the generating the graph;

wherein the graph is generated from the at least some of the received one or more logs after the removed one or more predefined attributes are removed therefrom.

14. The method of claim 13, wherein the removed one or more predefined attributes are selected to be removed because a quantity of different values of each of the removed one or more predefined attributes exceeds a threshold.

15. The method of claim 12, wherein the generating the graph comprises:
identifying a first event within the received one or more logs;
identifying, within the received one or more logs, a second event that is conceptually adjacent to the first event given at least one partitioning attribute that delineates a framework within which logged events are evaluated to determine whether or not they are conceptually adjacent to one another;
generating a first node corresponding to the first event, if not already generated;
generating a second node corresponding to the second event, if not already generated;
generating a first edge from the first node to the second node, if not already generated; and
incrementing a count associated with the first edge if already generated.

16. The method of claim 15, wherein the identification of the second event as being conceptually adjacent to the first event is based on a same user participating in the first event and then immediately subsequently participating in the second event, the immediately subsequently being determined by reference to a time attribute from the received one or more logs, the at least one partitioning attribute being a user identifying attribute by which the same user is distinguished from other users.

17. The method of claim 15, wherein the first event is a presentation of a first web resource to a user and the second event is a presentation of a second web resource to the same user, the second web resource being requested by the user through the first web resource, the at least one partitioning attribute being a user identifying attribute by which the same user is distinguished from other users.

18. The method of claim 12, wherein the random quantity of steps is determined prior to commencing the traversal of the generated graph for that candidate trajectory.

19. The method of claim 12, wherein the score is exponentially higher for incrementally greater quantities of steps.

20. One or more computer-readable storage media comprising computer-executable instructions for artificially creating dominant sequences that are representative of logged events, the computer-executable instructions, when executed by one or more processing units of a computing device, causing the computing device to:
receive one or more logs that comprise values of predefined attributes and, thereby, log multiple discrete events, wherein a single discrete event is logged with a single value for each of at least some of the predefined attributes;
generate, from at least some of the received one or more logs, a graph comprising multiple nodes and edges between pairs of nodes, each node representing a unique attribute-value pair;
produce a set of candidate trajectories, each candidate trajectory representing a sequence of events, by repeatedly traversing the generated graph starting from a randomly selected node and randomly proceeding to subsequent nodes for a random quantity of steps, in accordance with edge values;
generate a filtered set of candidate trajectories by removing candidate trajectories which, when compared with at least some of the received one or more logs, occur in the at least some of the received one or more logs less than a threshold amount; and
provide, as output responsive to the receipt of the one or more logs, at least some of the filtered set of candidate trajectories, wherein each provided candidate trajectories is associated with a score based on a quantity of steps in the provided candidate trajectory and a quantity of occurrences of the provided candidate trajectory in the at least some of the received one or more logs.

* * * * *